US012666014B2

(12) United States Patent
Ganesh et al.

(10) Patent No.: US 12,666,014 B2
(45) Date of Patent: Jun. 23, 2026

(54) OFFLOADING VIDEO CODING PROCESSES TO HARDWARE FOR BETTER DENSITY-QUALITY TRADEOFFS

(71) Applicant: Intel Corporation, Santa Clara, CA (US)

(72) Inventors: Brinda Ganesh, Portland, OR (US); Nilesh Jain, Portland, OR (US); Sumit Mohan, San Jose, CA (US); Faouzi Kossentini, Vancouver (CA); Jill Boyce, Portland, OR (US); James Holland, Folsom, CA (US); Zhijun Lei, Portland, OR (US); Chekib Nouira, Mission (CA); Foued Ben Amara, Vancouver (CA); Hassene Tmar, Richmond (CA); Sebastian Possos, Sammamish, WA (US); Craig Hurst, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/812,760

(22) Filed: Aug. 22, 2024

(65) Prior Publication Data

US 2025/0055987 A1 Feb. 13, 2025

Related U.S. Application Data

(63) Continuation of application No. 17/127,544, filed on Dec. 18, 2020, now Pat. No. 12,101,475.

(51) Int. Cl.
H04N 19/114 (2014.01)
H04N 19/154 (2014.01)

(52) U.S. Cl.
CPC ......... H04N 19/114 (2014.11); H04N 19/154 (2014.11)

(58) Field of Classification Search
CPC .. H04N 19/114; H04N 19/154; H04N 19/164; H04N 19/176; H04N 19/42; H04N 19/156; H04N 19/17; H04N 19/172; H04N 19/177; H04N 19/192; H04N 19/31; H04N 19/51; H04N 19/82; H04N 19/127; H04N 19/174; H04N 19/184; H04N 19/186; H04N 19/91
See application file for complete search history.

(56) References Cited

U.S. PATENT DOCUMENTS 8,345,768 B1 * 1/2013 Hobbs .................... H04N 19/34
375/240.26
2013/0034151 A1 2/2013 Zhou et al.
(Continued)

FOREIGN PATENT DOCUMENTS

CN 104885455 A * 9/2015 ............. H04N 19/13
DE 102019215911 A1 * 6/2020 ........... H04N 19/126
(Continued)

*Primary Examiner* — Tracy Y. Li
(74) *Attorney, Agent, or Firm* — Akona IP PC

(57) ABSTRACT

Techniques related to distributing the video encoding processing of an input video across hardware and software systems. Such techniques include evaluating the content of the video and determine whether or the encoding operation is best to be done on the hardware system only, software system only or a hybrid hardware and software system.

20 Claims, 8 Drawing Sheets

(56)        References Cited

U.S. PATENT DOCUMENTS

| | | | | |
|---|---|---|---|---|
| 2014/0161172 | A1* | 6/2014 | Wang ..................... | H04N 19/42 |
| | | | | 375/240.01 |
| 2019/0028745 | A1* | 1/2019 | Katsavounidis ........................... | |
| | | | | H04N 21/234345 |

FOREIGN PATENT DOCUMENTS

| | | | | | |
|---|---|---|---|---|---|
| JP | 2004297323 | A | | 10/2004 | |
| JP | 2011077564 | A | | 4/2011 | |
| KR | 20160064231 | A | * | 6/2016 | ......... H04N 21/6405 |

* cited by examiner

300

| Quality Level 1 | HW Latency 1 | SW Latency 1 |
| Quality Level 2 | HW Latency 2 | SW Latency 2 |
| ... | ... | ... |
| Quality Level N | HW Latency N | SW Latency N |

| Encoder Stage | Quality Level | HW Latency | SW Latency | Other Info |
|---|---|---|---|---|
| Pre Analysis | Quality Level PA | HW Latency PA | HW Latency PA | |
| Motion Estimaton | Quality Level ME | HW Latency ME | HW Latency ME | Modes Supported |
| ... | ... | ... | ... | ... |

600

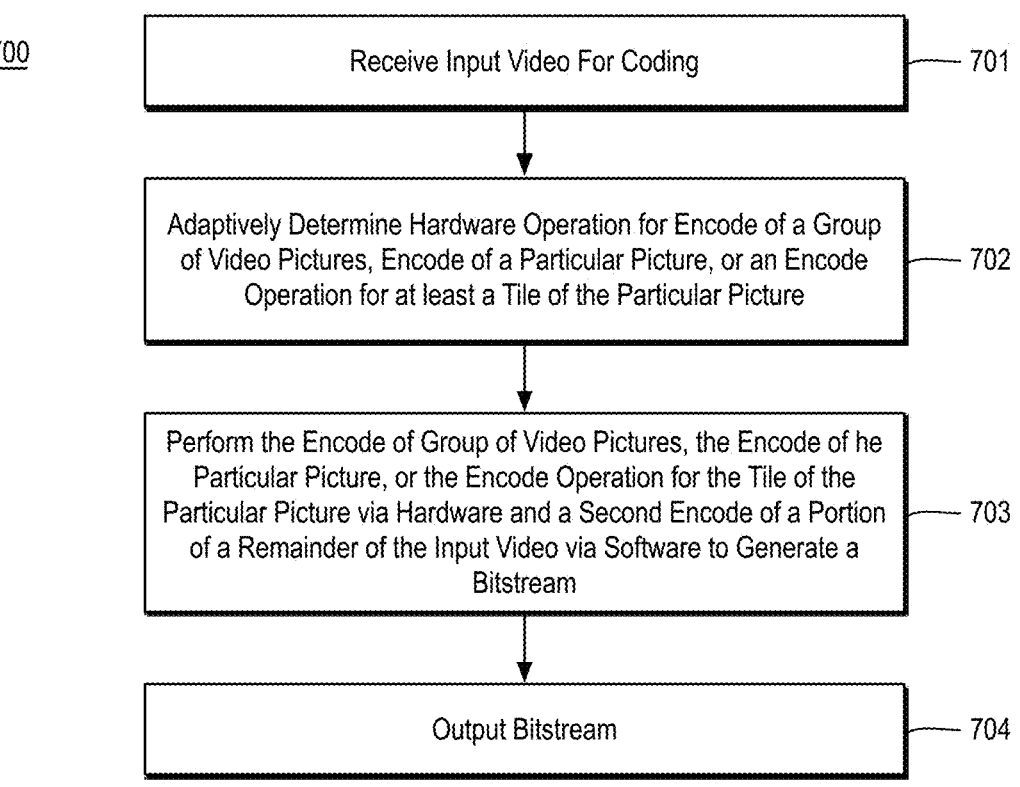

700

Receive Input Video For Coding — 701

Adaptively Determine Hardware Operation for Encode of a Group of Video Pictures, Encode of a Particular Picture, or an Encode Operation for at least a Tile of the Particular Picture — 702

Perform the Encode of Group of Video Pictures, the Encode of he Particular Picture, or the Encode Operation for the Tile of the Particular Picture via Hardware and a Second Encode of a Portion of a Remainder of the Input Video via Software to Generate a Bitstream — 703

Output Bitstream — 704

FIG. 7

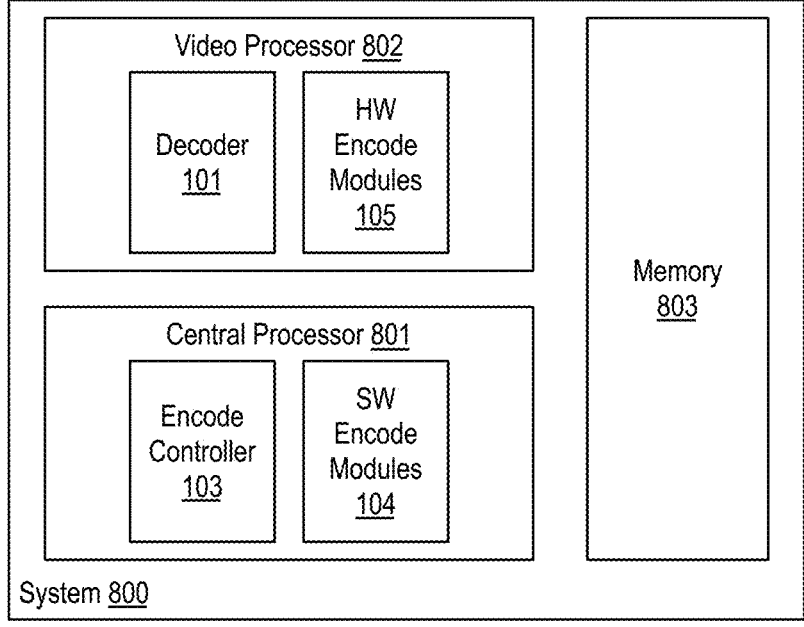

Video Processor 802

Decoder 101

HW Encode Modules 105

Central Processor 801

Encode Controller 103

SW Encode Modules 104

Memory 803

System 800

FIG. 8

OFFLOADING VIDEO CODING PROCESSES TO HARDWARE FOR BETTER DENSITY-QUALITY TRADEOFFS

CROSS REFERENCE TO RELATED APPLICATION

This application is a continuation (and claims benefit of priority under 35 U.S.C. § 120) of U.S. application Ser. No. 17/127,544 filed Dec. 18, 2020, entitled "OFFLOADING VIDEO CODING PROCESSES TO HARDWARE FOR BETTER DENSITY-QUALITY TRADEOFFS," the disclosure of which is considered part of (and is incorporated by reference in) the disclosure of the present application.

BACKGROUND

In compression/decompression (codec) systems including transcoding systems, compression efficiency, video quality, and computational complexity are important performance criteria. Visual quality is an important aspect of the user experience, compression efficiency impacts the amount of memory storage needed to store video files and/or the amount of bandwidth needed to transmit and/or stream video content, and computational complexity impacts the system complexity and time needed to process video content. For example, media coding and transcoding includes several different key operations or tools. Each of these tools have varying computational complexity and can be executed with different parameters depending on the desired quality level, compressibility, and target latency. Such coding and transcoding system design is focused on identifying the optimal subset of tools that are needed to be run to hit the desired quality level within a target latency. For example, generation of high-quality video content may include running multiple encoder passes and the usage of various types of inter/intra mode searches, which will take longer to execute. Furthermore, latency requirements can also dictate what tools to execute. Broadcast of live sporting events for example, requires high quality coding as well as an associated latency target. For lower quality encode, the coder will typically do a single encoder pass and run fewer mode searches.

There is an ongoing need to improve the efficiency of such coder systems for the application to a wide variety of coding contexts. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding elements. In the figures:

FIG. 7 is a flow diagram illustrating an example process for video coding including adaptive hybrid using selective software and hardware encode operations;

FIG. 8 is an illustrative diagram of an example system for video coding including adaptive hybrid using selective software and hardware encode operations;

DETAILED DESCRIPTION

Figure 1:
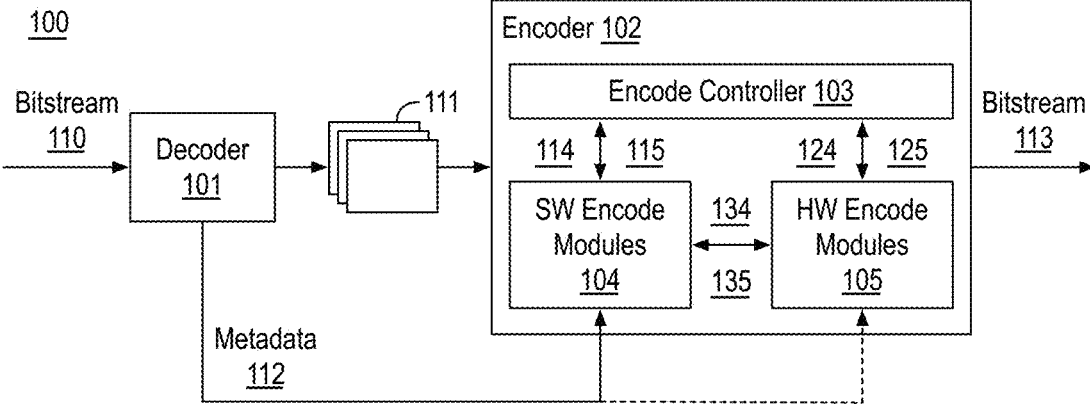
FIG. 1 is an illustrative diagram of an example system for video coding including adaptive hardware and software encode operations.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to adaptively offloading video coding processes to hardware.

As described above, in video encoding, multiple tools having varying computational complexity are employed to code input video. The encoding techniques discussed herein are presented with respect to video transcoding but may be employed in any context. For example, video transcoding includes decoding a received bitstream to generate video and encoding the video to an output bitstream representing the video content with differing characteristics such as video resolution, bitstream format, bitstream size, etc. The encoding techniques discussed herein may also be employed to encode received input video (e.g., clips or sequences of input video pictures). In some embodiments, such encoding includes adaptively applying hardware for portions of the encode. Such encode portions may be clips or groups of pictures of the video, a picture of the video, or an encode operation for the video (i.e., at least a tile of a particular picture). As used herein, the term encode operation indicates a task or group of tasks that provide an output for the encode inclusive of any suitable video data such as bitstream portion, a reconstructed frame portion, a motion vector motion vector field, video analysis parameters, and any other data or data structures discussed herein. As used herein, the term tile indicates any sub-picture portion of a video picture. A tile of a video picture include one or more blocks, one or more slices, one or more coding units, or the like. A tile may have any size or shape. Furthermore, a picture is defined as a group of blocks (or tiles or coding units or the like) that may or may not be equal to the size of an input picture. The received and/or output bitstreams may include any suitable encoded video data such as standards compliant video data. For example, the received and/or output bitstreams may be H.264/MPEG-4 Advanced Video Coding (AVC) standards compliant, H.265 High Efficiency Video Coding (HEVC) standards compliant, AOMedia Video 1 (AV1) standards compliant, VP9 standards compliant, etc.

In some embodiments, adaptive techniques are used to determine whether hardware is to be applied to the portion such as whether hardware is to be used in encode of a group of video pictures of the input video, encode of a particular picture of the input video, or an encode operation for the particular picture of the input video and software is to be used to encode the remaining portions of the input video. Such adaptive selection of hardware may be performed using any techniques discussed herein such as accessing a target video quality level, a target operation latency, and functional capabilities of the hardware and the software and selecting the hardware operation based on accessing a table using the target quality level, the target latency, and the functional capabilities such that the table correlates the target quality level, the target latency, and the functional capabilities to a corresponding hardware, software, or hybrid of hardware and software for the operation. The encode of group of video pictures, the encode of the particular picture, or the encode operation for the particular picture are then performed via hardware and at least a remainder of the input video is encoded via software to generate an output bitstream.

As used herein, the terms hardware, implemented via hardware, encoded on hardware, and similar terms indicate an operation or operations performed via a function call to a hardware resource such as fixed function circuitry, an application-specific integrated circuit, or other dedicated circuitry. Such hardware may be implemented as part of a central processor, a graphics processor, a video processor, or any such processing complex or pipeline. The terms software, implemented via software, encoded by software, and similar terms indicate an operation or operations performed via multiple instructions (i.e., lines of instructions) that may be compiled and run via a general device such as a processor. Such software may also be implemented via any processing device although it is typically performed via a central processor which routes compiled tasks to be performed by system resources. Hardware implementation entails little or no flexibility in how the operations are performed while software implementation provides full flexibility. The difference between hardware and software implementation may also be viewed based on the granularity of work performed (i.e., on the group of pictures level, the picture level, or the pixel level) with hardware implementation allowing only a single instruction at that level (i.e., submit an entire frame encode) while software implementation allows manipulation of any higher level of granularity via individual code for each sub-portion (i.e., encoding a frame using lines of code instructing how to code blocks or even pixels of the frame).

The determination of which groups of video pictures or pictures are encoded or which encode operations are performed using hardware and which are performed using software may be performed using any techniques discussed herein such as evaluation of target video quality level, target operation latency and other factors. As used herein, the term target video quality level indicates a level or value for the quality of any encode task including full encode or performance of an encode stage or the like. Higher quality levels indicate one or more of lower distortion (e.g., for frame encode), fuller search (e.g., for intra or motion estimation searching), or greater capability (e.g., including evaluation of more loop filters), and the like and lower quality indicate the opposite. The term target operation latency indicates a time (or, inversely, a frequency value) indicative of a speed for the corresponding task. Such target video quality level, target operation latency, and, optionally, others are then compared with the functional capabilities of the hardware and the software for the pertinent task. Between hardware and software capabilities, the closer match or the one capable of meeting the target requirements is then selected for the task. It is noted that prior and subsequent tasks may also impact the capability of the hardware and software capabilities for the current task. Examples of such tasks and their relative suitability for offload to hardware are discussed further herein. Notably, tasks performed in hardware typically have lower video quality level capability (or at least more restrictive implementation) and lower latency while the same tasks performed in software typically have higher video quality level capability and greater latency.

In the context of video coding, a variety of operating modes or levels are desirable depending on the context, which may vary from contexts that necessitate for the highest quality with little regard to latency (e.g., video on demand) to those that necessitate low latency with lower quality being acceptable (or tolerable) such as online gaming contexts. Other contexts require a mix of such characteristics. For example, as ranked from requiring higher quality while tolerating higher latency to those requiring lower latency at the cost of lower quality, such contexts include: broadcast content, premium over the top content, and live streaming. Other contexts may be employed in the spectrum of high quality/high latency to low quality/low latency. Notably, each usage model or context maps to a different operation mode in the encoder design and each mode requires a specific calibration of encoding tools to achieve the right quality level and the desired latency. For example, each usage model results in a different degree of pre-processing done in order to complete an encode. Furthermore, generation of high-quality video content involves running multiple encoder passes and the usage of various types of inter/intra mode searches, with such encodes taking longer to execute. Time requirements can also dictate what tools to execute. Broadcast of live sporting events, for example, requires not just a high quality transcode but also a strict latency target. For such usages, computationally complex tools may be used but the encoder may do only a single pass in order to maintain the latency requirement. In a lower quality targeted use-case, the encoder may only do a single encoding pass and use a limited set of minimally complex tools in order to maintain the speed and latency constraints. Other contexts and usage models may be employed.

Media transcoding and encoding from input video have grown in terms of computational complexity with the introduction of newer codecs such as AV1 and HEVC. These codecs focus on delivering improved compression rate at the similar quality levels using more computationally intensive tools. To accelerate these tools and offset the computational cost, in some embodiments, the encoder tools are implemented in hardware. However, to meet area goals (i.e., to use a limited hardware surface area), hardware implementations may cover only a subset of the tools themselves or a subset of the range of parameters within which a tool can operate. These tradeoffs are needed to make hardware implementations more affordable to productize. However, the result is that hardware implementations may not be used effectively at all quality levels. The techniques discussed herein provide for an algorithmic approach to better exploit a hybrid software (SW) and dedicated hardware (HW) acceleration solution in support of media transcoding and encoding. In some embodiments, given a specified performance level, the assignment of tasks that would run on the SW encoder and/or on the dedicated HW acceleration is performed using an optimization algorithm to achieve the best speed/latency/quality tradeoffs. Such techniques include a determination of, for example, whether a picture should go through one of the following: complete software encode, complete hardware encode, or a hybrid encode with some of the pictures being encoded by software and others being encoded by hardware or by encoding pictures using elements of the encoding process (e.g., pre-processing or late encoding operations) accelerated by hardware and the rest the encoding is being done in software.

FIG. 1 is an illustrative diagram of an example system 100 for video coding including adaptive hardware and software encode operations, arranged in accordance with at least some implementations of the present disclosure. As shown in FIG. 1, system 100 includes a decoder 101 and an encoder 102, which includes or implements a controller 103, software encode modules 104, and hardware encode modules 105. System 100 may receive bitstream 110 for transcoding to bitstream 113 such that bitstream has different characteristics with respect to bitstream 110 such as being representative of a different video resolution, having a different bitstream format, being compliant to a different codec, having a different bitstream size or bitrate, etc. Decoder 101 receives bitstream 110 and decodes it to generate input video 111 and optional metadata 112. In some embodiments, decoder 101 decodes bitstream 110 entirely in hardware. For example, the hardware used to implement decoder 101 may be separate from the hardware used to implement hardware encode modules 105 or they may be partially shared. Although illustrated with respect to video transcoding, system 100 may be implemented to perform video encoding only without the need of having decoder 101 in the system. Instead, processing may begin with receiving or attaining input video 111.

Bitstreams 110, 113 may be any suitable bitstream such as standards compliant bitstreams. For example, one or both of bitstreams 110, 113 may be AVC standards compliant, HEVC standards compliant, VP9 standards compliant, AV1 standards compliant, etc. System 100 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

System 100 may include other modules or components not shown for the sake of clarity of presentation. For example, encoder 102 may include one or more of a partition module, a transform module, a quantization module, an intra prediction module, a motion estimation module, a motion compensation module, a scanning module, an entropy encode module, etc. Furthermore, encoder 102 may include a local decode loop and decoder 101 that each may include an inverse quantization module, an inverse transform module, and an adder for combining reconstructed residual blocks with reference blocks, a deblock filtering module, a sample adaptive offset (SAO) filtering module, etc. Such modules and the operations associated therewith are known to those of skill in the art and are not discussed further herein for the sake of clarity in presentation.

Input video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 5K resolution video, 8K resolution video, or the like, and the video may include any number of video frames, sequences of video frames, pictures, groups of pictures, or the like. Techniques discussed herein are discussed with respect to pictures and blocks for the sake of clarity of presentation. However, such pictures may be characterized as frames, video frames, video pictures, sequences of frames or pictures, video sequences, or the like, and such blocks may be characterized as coding units, coding blocks, macroblocks, sub-units, sub-blocks, or the like. For example, a picture or frame of color video data may include a luminance plane or component and two chrominance planes or components at the same or different resolutions with respect to the luminance plane. Input video 111 may include pictures or frames that may be divided into blocks of any size, which contain data corresponding to, for example, M×N blocks of pixels. Such blocks may include data from one or more planes or color channels of pixel data. As used herein, the term block may include macroblocks, coding units, or the like of any suitable sizes. As will be appreciated such blocks may also be divided into sub-blocks for prediction, transform, or the like.

In contexts where decoder 101 decodes bitstream 110 to generate input video 111, decoder 101 may optionally generate metadata 112, which, if available, is provided to software encode modules 104 and, optionally, to hardware encode modules 105. In some embodiments, the encode of at least portions of input video 111 is based on metadata 112. In some embodiments, the encode of at least portions of input video 111 as performed by software encode modules 104 is based on metadata 112. It is noted that such metadata 112 may be more easily incorporated into software coding operations due to the flexibility of software while the use of metadata 112 by hardware encode modules 105 is more difficult due to the hardware functions being predefined and therefore less flexible to the use of metadata 112. However, in either case, metadata 112 may be used to assist in coding operations using any suitable technique or techniques. In some embodiments, metadata 112 includes coding mode decisions for blocks of input video 111 and such coding mode decisions may be used in the encode to assist mode selection (e.g., by limiting a search) or as candidate modes, etc. As used herein, the term coding mode decision indicates any coding mode or decision as selected for a block such as an intra or inter, an intra direction when intra, a motion vector, skip, or merge when inter, and so on. Such coding mode decisions may also include partitioning decisions, block filter selections, and so on.

Encoder 102 receives input video 111 and, optionally, metadata 112 and encoder 102 generates bitstream 113, which may have any format or characteristics discussed herein. As shown, encoder 102 includes an encode controller 103, which is implemented in software and controls the encode of input video 111 by performing portions of the encode in software via software commands 114 to software encode modules 104 to receive encode data 115 and by offloading at least portions of the encode of input video 111 via hardware commands 124 to receive encode data 125. Portions of encode data 115 and encode data 125 are then packaged to generate bitstream 113. Also as shown, software encode modules 104 may directly offload encode tasks to hardware encode modules 105 via hardware commands 134 to receive encode data 135. Such software command 114 and hardware commands 124, 134 may be used to perform any encode or coding operations discussed herein. Similarly, encode data 115, 125, 135 may include any encode data such as compressed video data, video data analytics, and the like. Thereby, a hybrid software and hardware encode architecture is provided.

Hardware encode modules 105 are invoked using hardware commands 124, 134 such that hardware commands 124, 134 may be a function call (i.e., a single function call) for hardware encode modules 105 to perform a predefined function, which may be any operation discussed herein such as encode of an entire picture, motion estimation, motion analysis, picture reconstruction, etc. Hardware encode modules 105 may be implemented via any dedicated hardware for the pertinent function such as fixed function circuitry, an application-specific integrated circuit, or other dedicated circuitry. Hardware encode modules 105 may be implemented as part of a central processor, a graphics processor, a video processor any such processing complex, processor pipeline, or multiprocessor system. Hardware encode modules 105 may include one or more such modules implemented on the same or different devices.

Software encode modules 104 are invoked by software commands 114 such that software commands 114 may be code or compiled code to perform any number of predefined functions. Such predefined functions may be any encode functions discussed herein such as temporal filtering, encode of an entire picture, mode decisions for a picture, global motion estimation, open loop intra searching, picture-based interpolation, motion analysis, picture reconstruction, etc. It is noted that the functions performed by hardware encode modules 105 and software encode modules 104 may overlap. That is, they may perform the same functions. However, the same functions may be performed with different characteristics or restrictions such as higher/lower quality, greater/lesser search, greater/lesser number of evaluated candidates, and so on such that software encode modules 104 provide higher quality, greater search, greater candidate evaluation, and more flexibility while hardware encode modules 105 generally provide lower quality, lesser search, lesser candidate evaluation, and little or no flexibility with the advantage of lower latency. Therefore, deployment of hardware encode modules 105 may be viewed as an offloading of particular functions or tasks for improved speed at the cost of lower quality.

The systems and techniques discussed provide an adaptive and hierarchical algorithm to determine what coding operations in media transcoding or media encoding are executed on software or hardware in a hybrid infrastructure such as a hybrid video coder. In some embodiments, the hybrid video coder makes decisions at multiple levels of the encode such as a macro level or picture level, which is defined as operations performed on a full picture end-to-end (i.e., a full picture encode), and a sub-macro level or sub-picture level, which is defined as looking at individual components of the entire coding and determining whether such individual components or operations are performed on hardware or software. Such sub-macro level or sub-picture level decisions may be based on quality requirements, latency requirements, and the quality supported by the hardware for the individual coding component or task.

Figure 2:
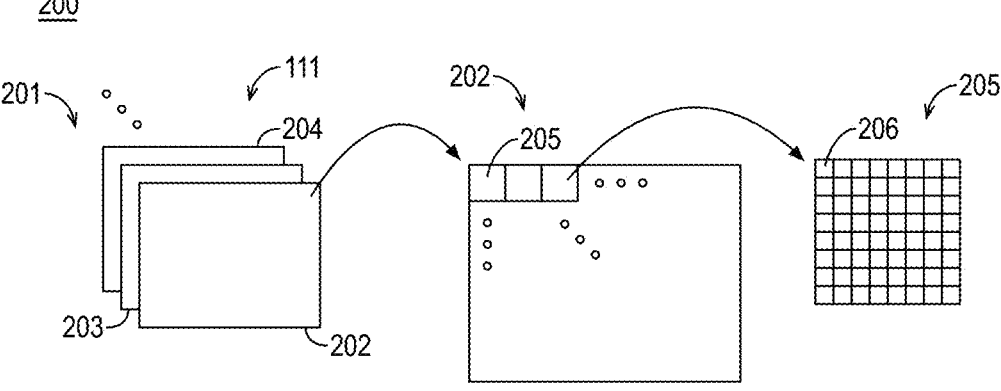
FIG. 2 is an illustrative diagram of example divisions of input video for hybrid encoding.

FIG. 2 is an illustrative diagram of example divisions 200 of input video 111 for hybrid encoding, arranged in accordance with at least some implementations of the present disclosure. As shown in FIG. 2, input video 111 may be divided into any number of groups of pictures 201 having any number of pictures. Input video 111 may also be divided into any number of clips of video (or input video 111 may itself be a clip of video), which may correspond with groups of pictures 201 or not. For example, a clip of video may include any number of temporally sequential video pictures such that the term temporally sequential indicates the video pictures in the clip are in a display order and immediately adjacent one another temporally without intervening pictures. A clip may include the same video pictures as a group of pictures or video pictures of any number of groups of pictures. Groups of pictures 201 also include any number of temporally sequential video pictures such as a predefined number of video pictures in a predefined coding hierarchy as discussed further herein with respect to FIG. 5. However, such group of pictures 201 may also be adaptive.

In the illustrated example, group of pictures 201 includes pictures 202, 203, 204 and any number of additional pictures in a display order. Group of pictures 201 may be encoded in a coding order different than the display order as is also discussed further herein. As shown with respect to picture 202, each picture of input video 111 is divided into or includes any number of blocks 205, which contain any number of pixels or pixel samples. Blocks 205, which may be characterized as coding blocks, coding units, and so on, may be any shape and size such as square (as illustrated) or rectangular. Blocks 205 may have the same size and shape or the sizes and shapes may vary based on encode decisions. It is noted that blocks 205 may be coding blocks and blocks 205 may be further divided into prediction blocks and transform blocks.

As shown, each of blocks 205 are divided into or include any number of pixels 206 (or pixel samples). In the illustrated example, block 205 includes 8×8 (64) pixel samples although, as discussed, any size and shape of blocks 205 may be employed. Each pixel 206 may include a luma value (Y), a luma value and color channel values (YUV), three color channel values (RGB), or other color channel representations. In some embodiments, the luma channel and color channels are provided at different resolutions.

In addition to divisions 200 of input video 111, various encode tasks are performed at such division levels. For example, encode tasks may be performed at the clip or group of picture, at the picture level of pictures 202, 203, 204, at the block level of blocks 205 (or at a prediction or transform block level), or at the level of pixels 206. Herein, the terms encode operation, coding operation, and similar terms indicate a coding operation performed at any such level in the hierarchy of input video 111. The input to such an encode operation may therefore be a clip, group of pictures, picture, block, or pixel (and any other pertinent data) and the output may be encoded data. Such encoded data may be a compressed version of the group of pictures, picture, block, or pixel or it may be data representative of the group of pictures, picture, block, or pixel (e.g., motion vectors, reconstructed versions, etc.). The techniques discussed herein may operate on any such level of granularity. Notably, hardware operations take such input data for the particular level of granularity and encode operation as a single hardware call and return the output data without modification of higher levels of granularity. In contrast, software operations for a particular level of granularity are modifiable (via lines of code, coding modules, compiled code, etc.) at higher levels of granularity.

Returning to FIG. 1, in some embodiments, encode controller 103 determines which encode operations are to be performed by accessing one or more tables based on a target video quality level, a target operation latency, and functional capabilities of a software encode module of software encode modules 104 and hardware encode module of hardware encode modules 105 for the encode operation or task. As used herein, the term table may include any suitable data structure that correlates on or more inputs to one or more corresponding outputs. For example, to achieve a hierarchical based hybrid video coder, encoder 102 may access a target quality level, a latency of operation, and functional capabilities of the hardware and software for a particular encode operation. Such data may be organized in an indexed table and a quick lookup may be performed to map the encode operations to the correct execution model or module between a software module and a hardware module. In some embodiments, a lookup table is pre-populated and enhanced with data during a run to update the capabilities of the hardware and software. In some embodiments, encoder 102 evaluates performance of an encode operation on a software module or a hardware module and updates a corresponding table value based on a video quality metric or a latency corresponding to the operation. The table value may be replaced, the prior and new values may be averaged, a moving average based on multiple measured values may be used, or the like such that the predefined table value is adjusted to an adjusted or real time value. In addition to the lookup table, additional heuristics can be executed that analyze the picture content and target where a given frame can be sent for transcoding. For example, a picture complexity may be evaluated and when the picture complexity is greater than a threshold, software is employed in place of hardware.

Figure 3:
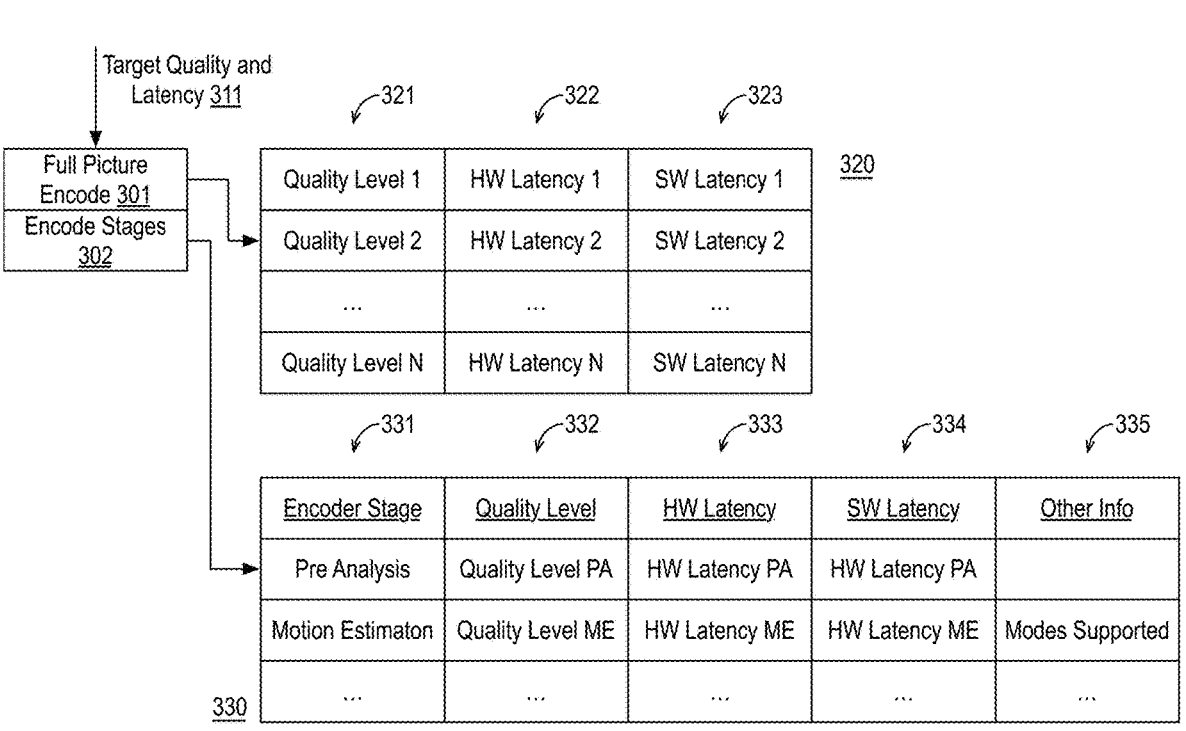
FIG. 3 is an illustrative diagram of example techniques for selecting between hardware and software in hybrid encoding decision making.

FIG. 3 is an illustrative diagram of example techniques 300 for selecting between hardware and software in hybrid encoding decision making, arranged in accordance with at least some implementations of the present disclosure. As shown in FIG. 3, for a particular granularity level (i.e., clip, group of pictures, picture, block, or pixel level), a target video quality and latency 311 are received. Target video quality and latency 311 may be generated or received using any suitable technique or techniques. In some embodiments, target video quality and latency 311 are predefined based on a coding context and/or coding content (video on demand content, broadcast content, premium over the top content, live streaming content, real-time gaming content, etc.).

Target video quality and latency 311 may be represented using any suitable data structure that indicates a target video quality and a target latency. In some embodiments, the target latency is indicated as a target time duration. In some embodiments, the target video quality is indicated as a metric that grades or rates the quality on a given scale (e.g., 0 to 10 or any other range). In some embodiments, the target video quality is given as a particular measure pertinent to the encode task such as target distortion, a target accuracy for motion vectors, etc. In some embodiments, the target video quality includes an indication of available features to be deployed.

In the illustrated example, an encoding granularity of a picture level is depicted. However, any granularity may be used. Furthermore, in some embodiments, multiple granularity levels and corresponding tables may be employed with offload to hardware being used at the lowest level capable of meeting the target video quality. For example, a clip level or group of pictures may first be evaluated and, if the clip quality can be met by hardware, hardware is used for the clip or group of pictures. If not, a picture level is evaluated for each of the pictures and, if the picture quality can be met by hardware, hardware is used for the picture, and so on. In some embodiments, if hardware cannot be used at the picture level (as shown), encode operations for the picture are evaluated.

For example, full picture encode evaluation operation 301 may access table 320 using target video quality and latency 311. Table 320 includes quality levels 321, hardware latency levels 322, and software latency levels 323 for a variety of picture types (e.g., intra picture, bidirectional picture, scene change picture, temporal layer pictures, etc.). For example, quality levels 321 may be the quality level attainable using hardware. Using such target video quality level, target operation latency, and functional capabilities of hardware and software, a suitable selection between hardware and software or between hardware and a hybrid of software and hardware is made.

In some embodiments, when the hardware encode of the picture, based on target video quality and latency 311 meets the target quality, hardware encode of the picture is used. In some embodiments, when the hardware encode does not meet the target quality level and the software latency meets the latency target, software encode or software and hardware hybrid encode (as discussed below) is selected.

As shown, when hardware encode only is not selected, encode stages evaluation operation 302 may access table 330 again using target video quality and latency 311. Table 330 includes, for various encoder stages 331 to be performed in hardware or software, quality levels 332, hardware latencies 333, software latencies 334, and other information 335 (if applicable). For example, for a pre-analysis encode stage, a quality level of the pre-analysis in hardware and a quality level of the pre-analysis in software are provided. For a motion estimation encode stage, a quality level of the motion estimation in hardware, a quality level of the motion estimation in software, and other information inclusive of the modes supported by the hardware motion estimation are provided.

For example, encode stages evaluation operation 302 may access table 330 using target video quality and latency 311 to determine which stages or operations of encode are to be offloaded to hardware. Table 330 includes, for various encoder stages 331 to be performed in hardware or software, quality levels 332, hardware latencies 333, software latencies 334, and other information 335 (if applicable). Encoder stages 331 may include only those stages that are supported in hardware, for example. Using such target video quality level, target operation latency, and functional capabilities of hardware and software for each encode stage, a suitable selection between hardware and software or between hardware and a hybrid of software and hardware is made. In some embodiments, when the hardware encode for the encode stage, based on target video quality and latency 311 meets the target quality, hardware encode for the encode stage is used. In some embodiments, when the hardware encode does not meet the target quality level for the encode stage and the software latency meets the latency target, software encode for the encode stage is selected.

Notably, such techniques provide a selection between a complete software, hybrid software, or dedicated hardware acceleration in support of media transcoding or media encoding. Given a specified performance level, the assignment of tasks that run on the software encoder and/or on the dedicated hardware acceleration are performed using an optimization algorithm to achieve the best speed/latency/quality tradeoffs. In some embodiments, as discussed, the levels at which the algorithm makes the decision is divided into the macro level (e.g., decide where operations should run for each picture) and micro level (e.g., which tools to use in specific operations) when it is not possible to offload the transcode level operations and hardware may be used purely as an assist to provide additional information to improve encoding quality.

Figure 4:
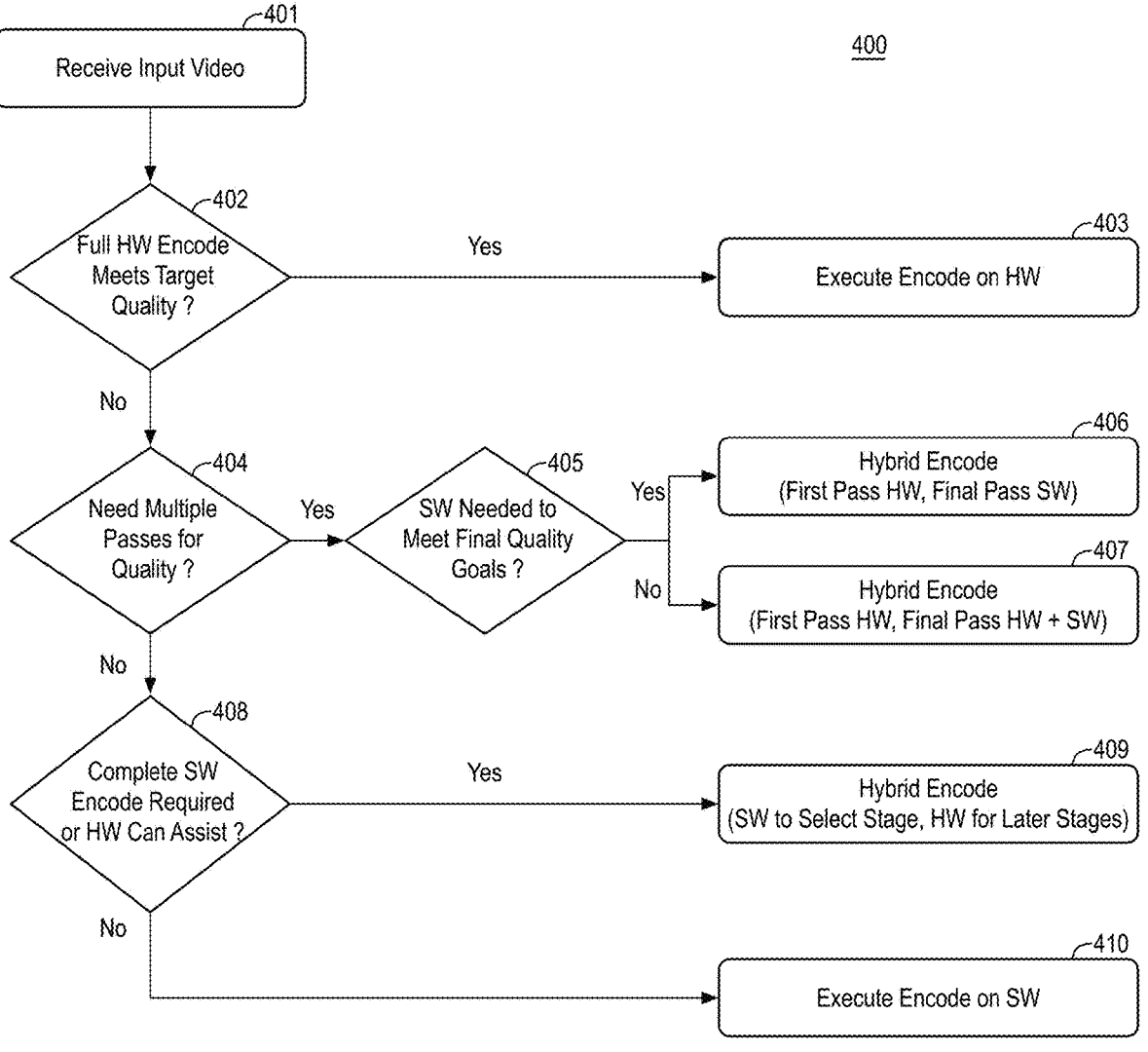
FIG. 4 is a flow diagram illustrating an example process for selecting hardware offloading in hybrid video encoding.

FIG. 4 is a flow diagram illustrating an example process 400 for selecting hardware offloading in hybrid video encoding, arranged in accordance with at least some implementations of the present disclosure. Process 400 may include one or more operations 401-410 as illustrated in FIG. 4. Process 400 may be performed by a device or system (e.g., encoder 102 of system 100) to perform hybrid hardware and software encoding of input video.

Process 400 begins at operation 401, where an input video picture is received for processing. Although illustrated with respect to video picture processing, process 400 may be performed at any level of granularity discussed with respect to FIG. 2 such as at the video clip of group of pictures level.

Processing continues at decision operation 402, where a determination is made as to whether a full hardware encode of the received picture meets a target video quality for the received video picture. If so, processing continues at operation 403, where a hardware only encode of the entire picture is performed.

Such a determination at operation 402 may be made using any suitable technique or techniques. In some embodiments, a received target quality for the video picture is compared to a quality a metric attainable by hardware and, if the target quality is met by the threshold or metric, the received picture is encoded entirely using hardware (i.e., a single instruction call to dedicated circuitry for coding a picture). In some embodiments, a content analysis of the input picture is performed by evaluating the complexity of the input picture based on which it would be decided to perform the full encode on HW if the content is deemed to be not complex from a coding point of view. In some embodiments, the temporal level or hierarchy placement of the received picture may be evaluated at operation 402 to determine whether the received video picture is to be encoded using hardware. In some embodiments, when the received video picture is a non-reference picture (i.e., no other picture uses the picture as a reference picture), hardware encode is selected. In some embodiments, when the received video picture, in a group of pictures hierarchy, is a highest temporal layer (i.e., no other picture uses the picture as a reference picture) or a second highest temporal layer reference picture (i.e., only pictures that are not referenced by other pictures use the picture as a reference picture), hardware encode is selected.

Figure 5:
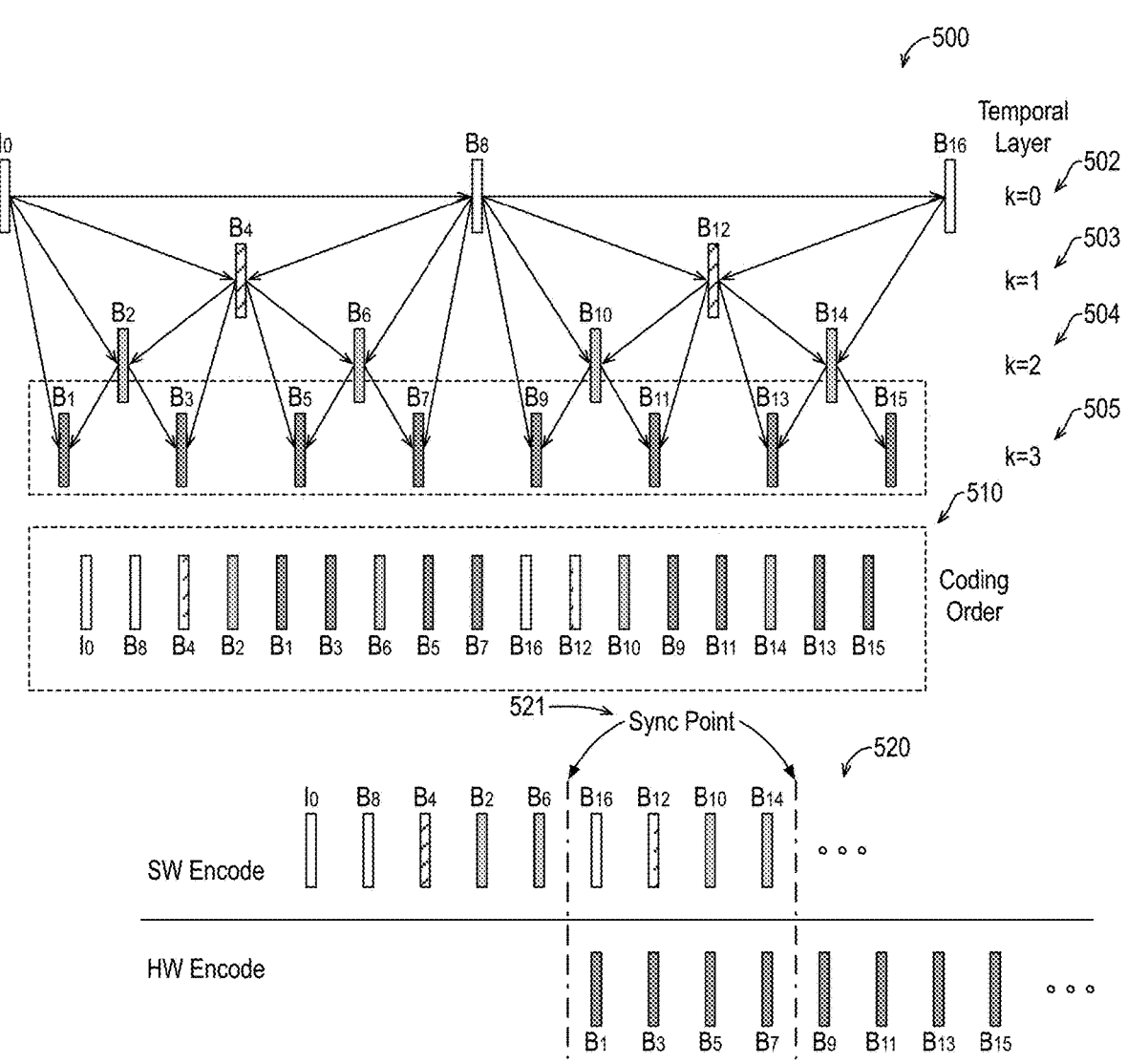
FIG. 5 is an illustrative diagram of an example hierarchical group of pictures structure, a corresponding coding order, and a corresponding software and hardware coding synchronization.

FIG. 5 is an illustrative diagram of an example hierarchical group of pictures structure 500, a corresponding coding order 510, and a corresponding software and hardware coding synchronization 520, arranged in accordance with at least some implementations of the present disclosure. As shown in FIG. 5, a hierarchical group of pictures structure 500, representative of a hierarchical B group of pictures (GOP) structure, includes an I picture $I_0$ and reference B pictures $B_8$, $B_{16}$ at a lowest temporal layer 502 k=0 of hierarchical group of pictures structure 500. As shown, I picture $I_0$ is coded without reference to any other $I_0$. Reference B pictures $B_3$, $B_{16}$ as well as I picture $I_0$ at lowest temporal layer 502 may be used as reference pictures for all higher temporal layers 503, 504, 505. The same holds for temporal layers 503, 504: reference pictures $B_4$, $B_{12}$ at temporal layer 503 k=1 may be used as reference pictures for both higher temporal layers 504, 505 and reference pictures $B_2$, $B_6$, $B_{10}$, $B_{14}$ at temporal layer 504 k=2 may be used as reference pictures for highest temporal layer 505. However, higher temporal layers are not used as reference pictures for lower temporal layers (or at the same layer for temporal layers 503, 504). Furthermore, non-reference pictures $B_1$, $B_3$, $B_5$, $B_7$, $B_9$, $B_{11}$, $B_{13}$, $B_{15}$ of highest temporal layer 505 k=3 are not used as reference pictures for any other pictures in hierarchical group of pictures structure 500. Although illustrated with respect to a hierarchical B GOP, other GOP structures may be employed. As used herein, the term lowest temporal layer indicates a layer used by any other layer as reference, the term lower temporal layer indicates a layer used by one or more other layers, and the term highest temporal layer indicates a layer not used as reference.

For hierarchical group of pictures structure 500, a coding order 510, based at least in part on the structure of reference pictures and their dependencies, is established. For example, pictures that are to be used as reference pictures for higher temporal layers must be coded prior to the pictures that reference them. As shown, for hierarchical group of pictures structure 500, coding order 510 is established in the following order: $I_0$, $B_8$, $B_4$, $B_2$, $B_1$, $B_3$, $B_6$, $B_5$, $B_7$, $B_{16}$, $B_{12}$, $B_{10}$, $B_9$, $B_{11}$, $B_{14}$, $B_{13}$, $B_{15}$, which differs from the presentation order: $I_0$, $B_{1, 2, \ldots 16}$.

Notably, in hierarchical group of pictures structure 500, nearly 50% of the pictures are non-reference pictures without cross-references. By selecting hardware only encode for such pictures, computation efficiency may be attained with minor quality impact on hierarchical group of pictures structure 500 since such pictures are not used as reference frames for any other pictures. As discussed, in some embodiments, quality may be maintained when both non-reference pictures of highest temporal layer 505 and reference pictures of second highest temporal layer 504 are encoded with hardware only. For example, non-reference pictures (i.e., pictures not used as a reference by any other picture) of highest temporal layer 505 and lower level pictures (i.e., pictures referenced only by pictures that are not used as a reference by any other picture) of temporal layer 504 may be encoded entirely in hardware.

Returning to FIG. 4, when hardware only encode is not selected for the video picture, processing continues at decision operation 404. As discussed at decision operation 402 and operation 403, in some embodiments, a received target quality for the video picture is compared to the quality metric attainable by hardware. If the target quality is not met by the quality metric, the received picture is not encoded entirely using hardware (i.e., software only is used or software with some encode tasks being offloaded to hardware is used). In some embodiments, a temporal level or hierarchy of the received picture is evaluated. In some embodiments, when the received video picture is a reference picture (i.e., at least one other picture uses the picture as a reference picture), hardware encode only is not selected. In some embodiments, when the received video picture is referenced by pictures in a temporal layer such that the other picture is also used as a reference picture, hardware encode is not selected.

With reference to FIG. 5, as discussed, in some embodiments, non-reference pictures are encoded using hardware only. In some embodiments, even higher temporal layer reference pictures (e.g., temporal layer 504, k=2, temporal layer 503, k=1, and/or temporal layer 502, k=0 non-intra pictures) are encoded using hardware only so long as quality of hardware encoded pictures combined with software encoded pictures can meet the target quality level for the pictures. In some embodiments, pictures of temporal layers 505, 504 are encoded using hardware only. In some embodiments, pictures of temporal layers 505, 504, 503 are encoded using hardware only. In some embodiments, non-intra pictures of temporal layers 505, 504, 503, 502 are encoded using hardware only.

FIG. 5 also illustrates, with respect to hardware coding synchronization 520, when pictures of temporal layers 505 are offloaded to hardware encode, particular pictures of hierarchical group of pictures structure 500 may be processed in parallel. For example, since hardware encode non-reference picture $B_1$ only references I picture $I_0$ and reference picture $B_2$, it may begin encoding any time after reference picture $B_2$ is complete. Similarly, non-reference picture $B_3$ may begin any time after reference picture $B_2$ is complete, non-reference picture $B_5$ may begin any time after reference picture $B_6$ is complete, non-reference picture $B_7$ may begin any time after reference picture $B_6$ is complete, and so on. In some embodiments, hardware coding synchronization 520 may begin hardware coding of non-reference pictures $B_1$, $B_3$, $B_5$, $B_7$ after the completion all reference pictures through reference picture $B_6$. Furthermore, hardware coding synchronization 520 illustrates synchronization point 521 where, after hardware encode completion of non-reference pictures $B_1$, $B_3$, $B_5$, $B_7$, the encode package for each picture is inserted into the correction position in coding order 510. For example, at least some of non-reference pictures $B_1$, $B_3$, $B_5$, $B_7$ may be processed via hardware in parallel with the processing of reference pictures $B_{16}$, $B_{12}$, $B_{10}$, $B_{14}$ in software and, after completion of non-reference pictures $B_1$, $B_3$, $B_5$, $B_7$, the encode packages may be inserted in coding order 510. Such processing may be repeated for non-reference pictures $B_9$, $B_{11}$, $B_{13}$, $B_{15}$, and so on.

Returning now to discussion of decision operation 404 in FIG. 4, processing continues for non-hardware only pictures with a determination as to whether multiple passes (i.e., two or more passes) are needed to meet the quality target for the current frame. Such multi-pass encoding may include any number of passes and may be performed using any suitable technique or techniques. If multiple passes are needed, processing continues at decision operation 405, where a determination is made as to whether software encoding is needed to meet the final quality target. For example, a software only final encode pass may be employed to meet the final quality target for a current picture.

If so, processing continues at operation 406, where a first encode pass is performed in hardware and a final encode pass is performed in software to provide a hybrid encode. In some embodiments, the final encode pass is a second encode pass. In some embodiments, the final encode pass being performed in software includes no portion of the final pass being performed or offloaded to hardware.

If a software only encoding final pass is not needed to meet the final quality target, processing continues at operation 407, where a first encode pass is performed in hardware and a final encode pass is performed in a combination of software and hardware to provide a hybrid encode. In some embodiments, the final encode pass is a second encode pass. In some embodiments, the final encode pass being performed in software and hardware includes particular stages being performed in software and other stages being performed in hardware using any techniques discussed herein. In some embodiments, the final encode pass includes running all stages up to the mode decision stage on software and then switching to the hardware implementation for subsequent stages including a reconstruction stage, a filtering stage, and an entropy coding stage.

Returning to decision operation 404, if multiple encode passes are not needed to meet the quality target for the current frame, processing continues at decision operation 408, where a determination is made as to whether the encode must be performed completely in software to meet the quality requirement or hardware can assist the encode by performing one or more encode operations. Such a determination may be made using any suitable technique or techniques. In some embodiments, the determination is made based on the target video quality level and target latency. In some embodiments, if the target video quality level can be met only by a software only encode, the software only encode is selected. In some embodiments, if a hybrid software and hardware encode can meet the target video quality level, a hybrid encode is selected. In some embodiments, if a hybrid software and hardware encode is required to meet the target latency and the hybrid software and hardware encode provides a quality level within a particular percentage of the target video quality level (e.g., 10% or 5%), then a hybrid encode is selected. Other selection techniques based on the target video quality level and target latency and the software only or hardware and software hybrid capabilities may be used. If a software only encode is required, processing continues at operation 410, where the encode is performed entirely in software without hardware assist.

If a software only encode is not required, processing continues at operation 409, where a single pass encode is performed with some encode operations performed in software and some performed in hardware. The split between software and hardware encode may be made using any suitable technique or techniques. In some embodiments, mode decision is performed in software and other encode operations are performed in software or offloaded to hardware depending on hardware availability (i.e., is the encode operation supported in hardware by the system). In some embodiments, one or more pre-mode decision encode operations are offloaded to hardware. In some embodiments, motion compensated temporal filtering is performed by hardware. In some embodiments, global motion estimation is performed by hardware. In some embodiments, flat IPP motion analysis is performed by hardware. In some embodiments, spatial analysis is performed by hardware. In some embodiments, open loop intra search is performed by hardware. In some embodiments, film grain synthesis is performed by hardware. In some embodiments, picture based interpolation is performed by hardware. In some embodiments, one or more post-mode decision encode operations are offloaded to hardware. In some embodiments, picture reconstruction is performed by hardware. In some embodiments, loop filtering is performed by hardware. In some embodiments, entropy coding is performed by hardware. Combinations of pre- and post-mode decision encode operation offload to hardware may be used.

Such techniques provide an adaptive and hierarchical algorithm to determine what coding operations in media transcoding or media encoding are executed on software or hardware in a hybrid infrastructure such as a hybrid video coder for improved density-quality tradeoffs.

Figure 6:
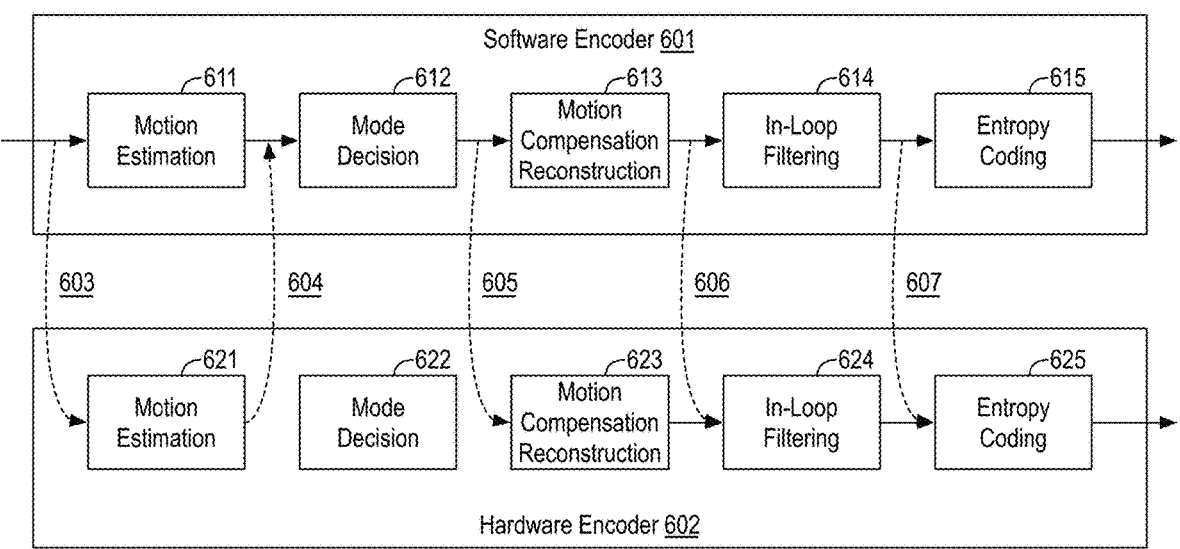
FIG. 6 is an illustrative diagram of example encode operation offloading to hardware in a hybrid encode pipeline.

FIG. 6 is an illustrative diagram of example encode operation offloading to hardware in a hybrid encode pipeline 600, arranged in accordance with at least some implementations of the present disclosure. As shown in FIG. 6, hybrid encode pipeline 600 includes a software encoder 601 (which may implement or be implemented by software encode modules 104) and a hardware encoder 602 (which may implement or be implemented by hardware encode modules 105). Furthermore, software encoder 601 implements a motion estimation module 611, a mode decision module 612, a motion compensation reconstruction module 613, an in-loop filtering module 614, and an entropy coding module 615. Each of motion estimation module 611, mode decision module 612, motion compensation reconstruction module 613, in-loop filtering module 614, and entropy coding module 615 perform an encode stage when software is selected to perform the corresponding stage. Software encoder 601 may also implement other encoding stages.

Similarly, hardware encoder 602 implements a motion estimation module 621, a mode decision module 622, a motion compensation reconstruction module 623, an in-loop filtering module 624, and an entropy coding module 625. Each of motion estimation module 621, mode decision module 622, motion compensation reconstruction module 623, in-loop filtering module 624, and entropy coding module 625 may perform the corresponding encode stage when hardware is selected to perform the corresponding stage or such modules may assist in the encode such that they provide encode data to the corresponding software module, which uses the hardware encode data and finalizes the encode operation or stage.

For example, a hybrid encoding solution such as hybrid encode pipeline 600 can choose to selectively run each stage in hardware or software based on the capability of the hardware (e.g., quality and latency based tradeoffs) or choose to enter and exit a hardware/software based on a predefined approach at the various points shown in FIG. 6 with respect to transition points 603, 604, 605, 606, 607. For example, the latter techniques provide the advantage of minimizing the overhead of communication between software encoder 601 and hardware encoder 602. FIG. 6 and the following describe exemplary hardware/software hybrid approaches although others may be used.

In some embodiments, motion estimation and pre-analysis are offloaded to hardware encoder 602 and the remaining encode stages (mode decision, motion compensation reconstruction, in-loop filtering, and entropy coding) are performed by software encoder 601 as shown with respect to transition points 603, 604 (i.e., only transition points 603, 604 are employed while transition points 605, 606, 607 may be bypassed in this embodiment). For example, the nature of pre-analysis, inclusive of motion estimation, makes it suitable to offload to hardware encoder 602.

In some embodiments, the decision for a hybrid system includes always selecting to perform the pre-analysis stage in hardware unless the overhead of communication between hardware and software are excessive. In some embodiments, the decision to offload pre-analysis, inclusive of motion estimation, is based on the hardware support for mode exploration by motion estimation module 621. For example, depending on hardware implementation, motion estimation module 621 may provide different levels of support for evaluating motion estimation modes. In some embodiments, low and medium quality encodings explore fewer modes, which are most likely to be found via hardware deployment of motion estimation module 621. In some embodiments, high quality encodings may search multiple encoding modes that hardware encoder would not support. In some embodiments, the hardware encoder provides as output the priority of the modes to help with the mode decision stage. For example, when the target video quality level is low or medium, offload is performed and, when the target video quality level is high, offload is not performed. In some embodiments, motion estimation module 621 provides a hardware assist by providing best modes based on limited mode evaluation and motion estimation module 611 uses those modes and evaluates further modes to complete the pre-analysis and motion estimation.

In addition, or in the alternative, the motion compensation stage as performed motion compensation reconstruction module 613 and motion compensation reconstruction module 623 may be enhanced in hardware via motion compensation reconstruction module 623 to provide support for features such as global motion compensation. Such techniques allow the software as implemented by motion estimation module 611, for example, to initialize a search region for scenes where the camera is moving and such motion estimation may be performed hardware (e.g., motion estimation module 621) or by software (e.g., motion estimation module 611) based on the motion compensation vectors output by the hardware. In some embodiments, the hardware (e.g., motion estimation module 621 and/or compensation reconstruction module 623) provides three half-pixel positions, which is advantageous when interpolation is not enabled in the hardware encoder. Such techniques are particularly advantageous for modes where latency is an issue and hardware can run this faster than what can be done in software. Such techniques may require enhancing the information on run duration for this process alone to help make the offloading decision.

In some embodiments, motion compensation, reconstruction, in-loop filtering, and entropy coding stages are offloaded to hardware encoder 602 while previous stages are performed by software encoder 601. In such embodiments, transition point 605 is employed and transition points 603, 604, 606, 607 are not employed or are bypassed. In such embodiments, software encoder 601 performs motion estimation using module 611 and mode decision using module 612 to determine which modes need to be executed. If such modes are supported by hardware encoder 602, a direct offload to hardware can be provided such that remaining encode stages are performed by motion compensation reconstruction module 623, in-loop filtering module 624, and entropy coding module 625 of hardware encoder 602. In some embodiments, mode decisions are biased by mode decision module 612 to balance what is available in hardware encoder 602 (for acceleration) and what is needed for quality. In some embodiments, in mode selection, a penalty is applied to modes that are not available in hardware relative to those that are available in hardware (e.g., by adding a value to hardware unavailable modes or deducting a value from hardware available modes in an optimization that searches for a minimum rate distortion mode).

In some embodiments, in-loop filtering and entropy coding stages are offloaded to hardware encoder 602 while previous stages are performed by software encoder 601. In such embodiments, transition point 606 is employed and transition points 603, 604, 605, 607 are not employed or are bypassed. In such embodiments, software encoder 601 performs mode decision via mode decision module 612 (and motion estimation module 611 and pre-analysis) and motion compensation reconstruction of reconstructed pictures based on hardware encoder 602 having the capability to support the quality needed for in-loop filtering and entropy coding. If latency is a constraint, such an encode path and appropriate parameters may be selected to achieve the target latency with minimal reduction in quality level.

In some embodiments, only the entropy coding stage is offloaded to hardware encoder 602 while all previous stages are performed by software encoder 601. In such embodiments, transition point 607 is employed and transition points 603, 604, 605, 606 are not employed or are bypassed. In such embodiments, software encoder 601 performs pre-analysis, motion estimation, mode decision, motion compensation, picture reconstruction, and in-loop filtering and hardware encoder 602 performs entropy coding via entropy coding module 625. Such techniques may provide flexibility in encode while taking advantage of hardware acceleration of entropy coding.

FIG. 7 is a flow diagram illustrating an example process 700 for video coding including adaptive hybrid using selective software and hardware encode operations, arranged in accordance with at least some implementations of the present disclosure. Process 700 may include one or more operations 701-704 as illustrated in FIG. 7. Process 700 may form at least part of a video coding or transcoding process. By way of non-limiting example, process 700 may form at least part of a video coding or transcoding process as performed by any device or system as discussed herein such as system 100. Furthermore, process 700 will be described herein with reference to system 800 of FIG. 8.

FIG. 8 is an illustrative diagram of an example system 800 for video coding including adaptive hybrid using selective software and hardware encode operations, arranged in accordance with at least some implementations of the present disclosure. As shown in FIG. 8, system 800 includes a central processor 801, a video processor 802, and a memory 803. Also as shown, video processor 802 may include or implement decoder 101 and hardware encode modules 105 and central processor 801 may include or implement encode controller 103 and software encode modules 104. In an embodiment, memory 803 stores a machine learning model for implementation. Furthermore, in the example of system 800, memory 803 may store video data or related content such as picture data, target video quality levels, target operational latencies, functional capabilities of hardware and software, analytics data, motion vectors, reconstructed pixel vales, filter parameters, quantization parameters, bitstream data, and/or any other data as discussed herein.

As shown, in some embodiments, video processor 802 implements decoder 101 and hardware encode modules 105. In some embodiments, one, both or portions of decoder 101 and hardware encode modules 105 are implemented by central processor 801, a graphics processor, or the like.

Video processor 802 may include any number and type of video, image, or graphics processing units that may provide the operations as discussed herein. Such operations may be implemented via software or hardware or a combination thereof. For example, video processor 802 may include circuitry dedicated to manipulate pictures, picture data, or the like obtained from memory 803. Central processor 801 may include any number and type of processing units or modules that may provide control and other high level functions for system 800 and/or provide any operations as discussed herein. Memory 803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 803 may be implemented by cache memory.

In an embodiment, one or more or portions of decoder 101 and hardware encode modules 105 are implemented via an execution unit (EU). The EU may include, for example, programmable logic or circuitry such as a logic core or cores that may provide a wide array of programmable logic functions. In an embodiment, one or more or portions of decoder 101 and hardware encode modules 105 are implemented via dedicated hardware such as fixed function circuitry or an application-specific integrated circuit or the like. Fixed function circuitry may include dedicated logic or circuitry and may provide a set of fixed function entry points that may map to the dedicated logic for a fixed purpose or function. An application-specific integrated circuit may be an integrated circuit customized for a particular use (as opposed to being general purpose).

Returning to discussion of FIG. 7, process 700 begins at operation 701, where input video is received for coding. The input video may be video at any suitable resolution and in any suitable format. In some embodiments, process 700 is an encoding process such that a compressed bitstream is generated based on the input video. In some embodiments, process 700 is a transcoding process such that a received bitstream is used to generate input video, which is in turn compressed to an output bitstream. In some embodiments, process 700 further includes decoding a received bitstream via hardware to generate the input video. In some embodiments, a software encode of the input video is based at least in part on metadata generated by the decoding of the received bitstream. The output bitstream and, if applicable, received bitstream may be in any format such as codec compliant format. For example, the received and/or output bitstreams may be AVC standards compliant, HEVC standards compliant, AV1 standards compliant, or VP9 standards compliant.

Processing continues at operation 702, where a hardware operation is adaptively determined to be applied for at least one of an encode of a group of video pictures of the input video, an encode of a particular picture of the input video, or an encode operation for at least a tile of the particular picture of the input video. The hardware operation may be determined at any level of granularity of the input video such as a group of pictures or clip level, a picture level, a tile level, a slice level, or a block level. Furthermore, the hardware operation may be determined for such input video levels for any encode stage such as pre-analysis, motion estimation, mode decision, motion compensation, picture reconstruction, in-loop filtering, or entropy coding.

Processing continues at operation 703, where the encode of the group of video pictures, the encode of the particular picture, or the encode operation for the tile of the particular picture is performed via hardware and at least a second encode of a portion of a remainder of the input video is performed via software to generate an output bitstream. For example, in contexts where the (encoding of a) group of video pictures is performed using hardware only, another group of pictures or portion thereof is encoded via software, in contexts where the particular picture is performed using hardware only, another picture or portion thereof is encoded via software, and in contexts where the encode operation is performed using hardware only, another encode operation for the particular picture, another picture, or another group of pictures, is performed or encoded via software. Such hardware operations may be evoked via a hardware call or instruction call to the hardware being used to perform the encode operation, encode task, or encode stage.

In some embodiments, process 700 further includes accessing a target video quality level, a target operation latency, and functional capabilities of the hardware and the software and selecting the hardware operation based on accessing a table using the target quality level, the target latency, and the functional capabilities. In some embodiments, the particular picture is in a group of pictures of the input video, and wherein the hardware operation is determined for the encode of the particular picture in response to one of the particular picture being in a higher temporal layer in the group of pictures or a first quality target for the particular picture being met by a hardware only picture encode quality metric corresponding to the hardware operation, wherein a second picture in the group of pictures is coded at least partially in software in response to the second picture being in a lower temporal layer in the group of pictures or a second quality target for the second picture not being met by the hardware only picture encode quality metric. In some embodiments, process 700 further includes encoding the second picture using multi-pass encoding in response to multi-pass encoding being required to meet the second quality target, wherein the multi-pass encoding comprises performing first pass using the hardware or second hardware and performing a subsequent pass at least partially in software. In some embodiments, process 700 further includes determining multi-pass encoding is not needed to meet the second quality target and performing single pass encode of the second frame comprising software encode up to a particular encode stage and hardware encode for one or more subsequent stages to the particular encode stage. In some embodiments, the particular encode stage comprises a mode decision stage and the one or more subsequent stages comprise a reconstruction stage, a filtering stage, and an entropy coding stage.

In some embodiments, the encode operation for the particular picture comprises one of a plurality of first encode operations for encode of the particular picture, the plurality of first encode operations are performed via hardware, the encode of the particular picture comprising one or more second encode operations performed via software. In some embodiments, the first encode operations comprise one or more of motion compensated temporal filtering, global motion estimation, flat picture analysis, spatial analysis, open loop intra search, film grain synthesis, picture based interpolation, picture reconstruction, loop filtering, or entropy coding and the one or more second encode operations comprise mode decision. In some embodiments, the hardware comprises one of fixed function circuitry or an application-specific integrated circuit and the second encode via software comprises running a plurality of lines of instruction code via a general purpose device.

Processing continues at operation 704, where the output or resultant bitstream is output. The output or resultant bitstream may be transmitted to another device for eventual decode, stored at local or remote memory for eventual decode, or the like. As discussed, the output or resultant bitstream may be in any suitable format such as an AVC standards compliant format, an HEVC standards compliant format, an AV1 standards compliant format, or a VP9 standards compliant format.

Process 700 may be repeated any number of times either in series or in parallel for any number video clips, groups of pictures, pictures, or encode operations. As discussed, process 700 may provide for video coding or transcoding including hybrid software and hardware coding for better density-quality tradeoffs.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity. In some embodiments, the operations discussed herein are performed by a system including a memory to store any data discussed herein and one or more processors to perform the operations of process 700 or others discussed herein.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein.

The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein. In some embodiments, the operations discussed herein are performed by a non-transitory machine readable medium comprising a plurality of instructions that, in response to being executed on a computing device, cause the computing device to perform the operations.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
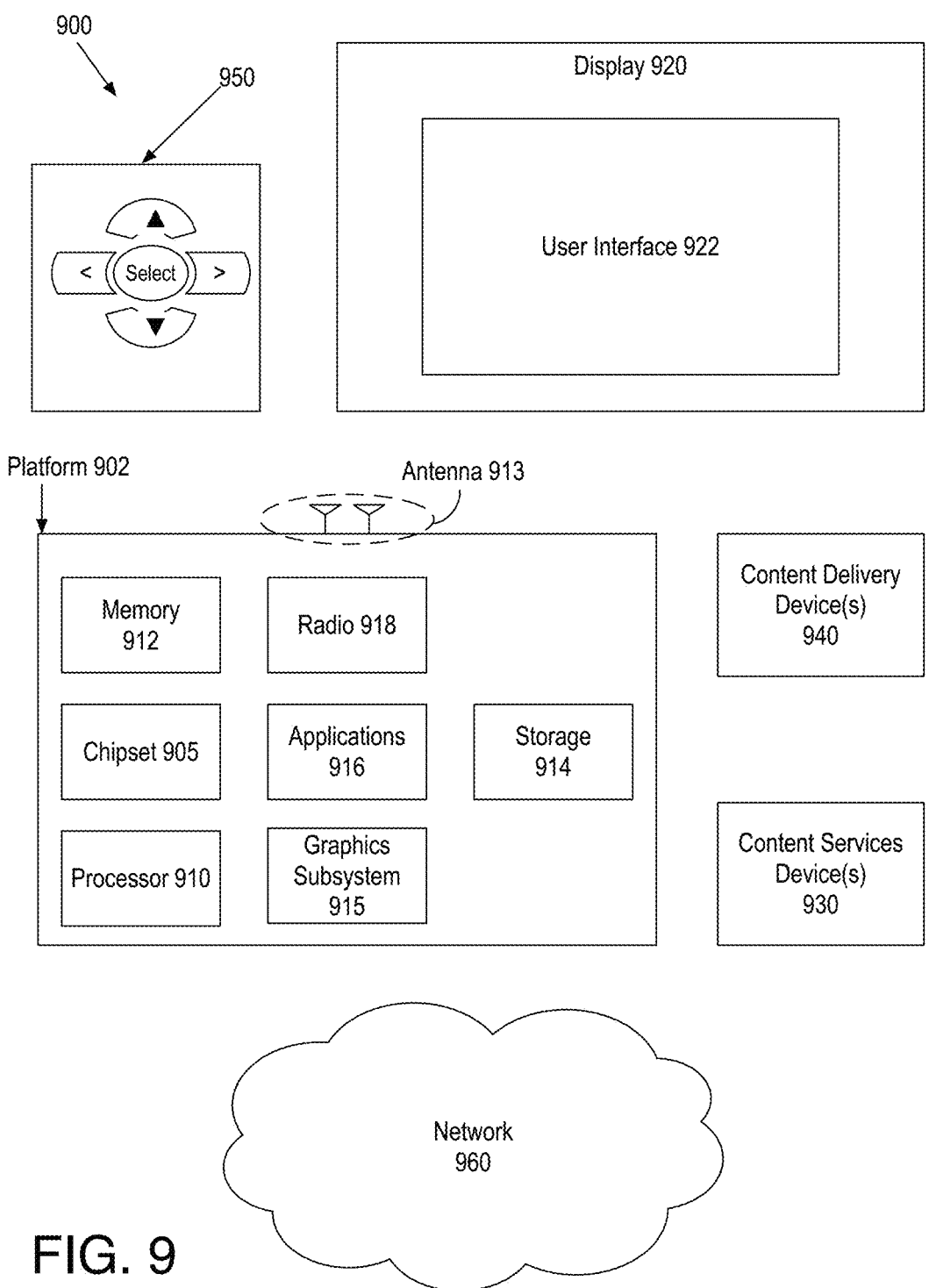
FIG. 9 is an illustrative diagram of an example system.

FIG. 9 is an illustrative diagram of an example system 900, arranged in accordance with at least some implementations of the present disclosure. In various implementations, system 900 may be a mobile system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, antenna 913, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of uni-directionally or bi-directionally communicating content between content providers and platform 902 and/display 920, via network 960 or directly. It will be appreciated that the content may be communicated uni-directionally and/or bi-directionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of may be used to interact with user interface 922, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 920) by movements of a pointer, cursor, focus ring, or other visual indicators displayed on the display. For example, under the control of software applications 916, the navigation features located on navigation may be mapped to virtual navigation features displayed on user interface 922, for example. In various embodiments, may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
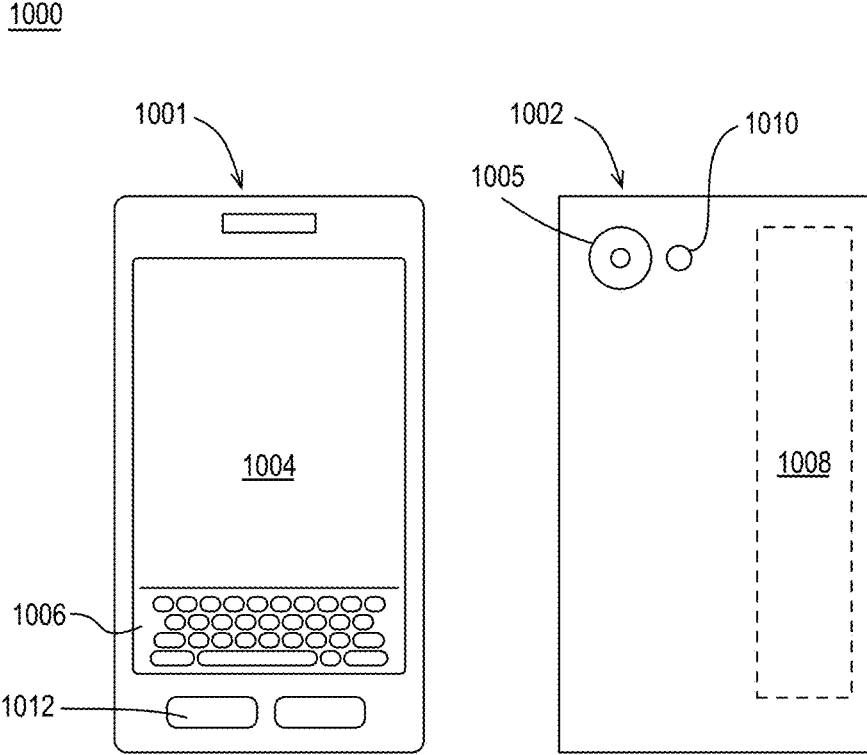
FIG. 10 illustrates an example device, all arranged in accordance with at least some implementations of the present disclosure.

As described above, system 900 may be embodied in varying physical styles or form factors. FIG. 10 illustrates an example small form factor device 1000, arranged in accordance with at least some implementations of the present disclosure. In some examples, system 900 may be implemented via device 1000. In other examples, system 100 or portions thereof may be implemented via device 1000. In various embodiments, for example, device 1000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. As shown, device 1000 may include a camera 1005 (e.g., including a lens, an aperture, and an imaging sensor) and a flash 1010 integrated into back 1002 (or elsewhere) of device 1000. In other examples, camera 1005 and flash 1010 may be integrated into front 1001 of device 1000 or both front and back cameras may be provided. Camera 1005 and flash 1010 may be components of a camera module to originate image data processed into streaming video that is output to display 1004 and/or communicated remotely from device 1000 via antenna 1008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores, may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for video coding comprises receiving input video for coding, adaptively determining a hardware operation is to be applied for at least one of an encode of a group of video pictures of the input video, an encode of a particular picture of the input video, or an encode operation for at least a tile of the particular picture of the input video, and performing the encode of the group of video pictures, the encode of the particular picture, or the encode operation for the tile of the particular picture via hardware and at least a second encode of a portion of a remainder of the input video via software to generate an output bitstream.

In one or more second embodiments, further to the first embodiment, the method further comprises accessing a target video quality level, a target operation latency, and functional capabilities of the hardware and the software and selecting the hardware operation based on accessing a table using the target quality level, the target latency, and the functional capabilities.

In one or more third embodiments, further to the first or second embodiments, the particular picture is in a group of pictures of the input video, and wherein the hardware operation is determined for the encode of the particular picture in response to one of the particular picture being in a higher temporal layer in the group of pictures or a first quality target for the particular picture being met by a hardware only picture encode quality metric corresponding to the hardware operation, wherein a second picture in the group of pictures is coded at least partially in software in response to the second picture being in a lower temporal layer in the group of pictures or a second quality target for the second picture not being met by the hardware only picture encode quality metric.

In one or more fourth embodiments, further to any of the first through third embodiments, encoding the second picture using multi-pass encoding in response to multi-pass encoding being required to meet the second quality target, wherein the multi-pass encoding comprises performing first pass using the hardware or second hardware and performing a subsequent pass at least partially in software.

In one or more fifth embodiments, further to any of the first through fourth embodiments, the method further comprises determining multi-pass encoding is not needed to meet the second quality target and performing single pass encode of the second frame comprising software encode up to a particular encode stage and hardware encode for one or more subsequent stages to the particular encode stage.

In one or more sixth embodiments, further to any of the first through fifth embodiments, the method further comprises the particular encode stage comprises a mode decision stage and the one or more subsequent stages comprise a reconstruction stage, a filtering stage, and an entropy coding stage.

In one or more seventh embodiments, further to any of the first through sixth embodiments, the encode operation for the tile of the particular picture comprises one of a plurality of first encode operations for encode of the tile of the particular picture, the plurality of first encode operations are performed via hardware, the encode of the tile of the particular picture comprising one or more second encode operations performed via software.

In one or more eighth embodiments, further to any of the first through seventh embodiments, the first encode operations comprise one or more of motion compensated temporal filtering, global motion estimation, flat picture analysis, spatial analysis, open loop intra search, film grain synthesis, picture based interpolation, picture reconstruction, loop filtering, or entropy coding and the one or more second encode operations comprise mode decision.

In one or more ninth embodiments, further to any of the first through eighth embodiments, the hardware comprises one of fixed function circuitry or an application-specific integrated circuit and the second encode via software comprises running a plurality of lines of instruction code via a general purpose device.

In one or more tenth embodiments, further to any of the first through ninth embodiments, the method further comprises decoding a received bitstream via second hardware to generate the input video.

In one or more eleventh embodiments, further to any of the first through tenth embodiments, the second encode via software is based at least in part on metadata generated by the decoding of the received bitstream.

In one or more twelfth embodiments, a device or system includes a memory and one or more processors to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for video processing, comprising:
   determining a target video quality and a target latency for an input video;
   encoding, using a hardware encode module, the input video, in response to determining that the target video quality is met by a quality metric attainable by the hardware encode module and the target latency is met by a latency attainable by the hardware encode module;
   determining that multiple passes are needed to meet a further target video quality of the input video;

performing, using the hardware encode module, a first encode pass of the multiple passes; and
   performing, using software, a final encode pass of the multiple passes.

2. The method of claim 1, wherein one or more of the target video quality, the target latency, and the further target video quality are predefined based on a coding context of the input video.

3. The method of claim 2, wherein the coding context includes one of: video on demand content, broadcast content, premium over the top content, live streaming content, and real-time gaming content.

4. The method of claim 1, wherein one or more of the target video quality, the target latency, and the further target video quality are predefined based on a type of coding content.

5. The method of claim 1, wherein the hardware encode module is an application-specific integrated circuit.

6. The method of claim 1, wherein the hardware encode module is a part of a System-on-a-Chip.

7. The method of claim 1, further comprising:
   decoding, using the hardware encode module, the input video.

8. The method of claim 1, wherein the final encode pass is a second encode pass of the multiple passes.

9. The method of claim 1, further comprising:
   generating an encoded bitstream based on the multiple passes, wherein the encoded bitstream is H.264 compliant.

10. The method of claim 1, further comprising:
   generating an encoded bitstream based on the multiple passes, wherein the encoded bitstream is VP9 compliant.

11. The method of claim 1, further comprising:
   generating an encoded bitstream based on the multiple passes, wherein the encoded bitstream is AV1 compliant.

12. An apparatus, comprising:
   a memory to store instructions; and
   one or more processors to execute the instructions, wherein the instructions, when executed by the one or more processors, cause the one or more processors to:
      determine a target video quality and a target latency for an input video;
      command a hardware encode module to encode the input video, in response to determining that the target video quality is met by a quality metric attainable by the hardware encode module and the target latency is met by a latency attainable by the hardware encode module;
      determine that multiple passes are needed to meet a further target video quality;
      command the hardware encode module to perform a first encode pass of the multiple passes; and
      command software to perform a final encode pass of the multiple passes.

13. The apparatus of claim 12, wherein one or more of the target video quality, the target latency, and the further target video quality are predefined based on a coding context of the input video.

14. The apparatus of claim 13, wherein the coding context includes one of: video on demand, broadcast, premium over the top, live streaming, and online gaming.

15. The apparatus of claim 12, wherein one or more of the target video quality, the target latency, and the further target video quality are predefined based on a type of coding content.

16. The apparatus of claim 12, wherein the instructions further cause the one or more processors to:

command the hardware encode module to decode the input video.

17. The apparatus of claim 12, wherein the final encode pass is a second encode pass of the multiple passes.

18. The apparatus of claim 12, wherein the instructions further cause the one or more processors to:

generate an encoded bitstream based on the multiple passes, wherein the encoded bitstream is H.264 compliant.

19. The apparatus of claim 12, wherein the instructions further cause the one or more processors to:

generate an encoded bitstream based on the multiple passes, wherein the encoded bitstream is VP9 compliant.

20. The apparatus of claim 12, wherein the instructions further cause the one or more processors to:

generate an encoded bitstream based on the multiple passes, wherein the encoded bitstream is AV1 compliant.

\* \* \* \* \*